(12) United States Patent
Retali

(10) Patent No.: US 8,482,410 B2
(45) Date of Patent: Jul. 9, 2013

(54) METHOD OF DETECTING THE OPERATION OF A VOICE SIGNAL WIRELESS TRANSMISSION DEVICE

(76) Inventor: Dominique Retali, Le Perreux sur Marne (FR)

( * ) Notice: Subject to any disclaimer, the term of this patent is extended or adjusted under 35 U.S.C. 154(b) by 341 days.

(21) Appl. No.: 13/027,940

(22) Filed: Feb. 15, 2011

(65) Prior Publication Data
US 2011/0199208 A1    Aug. 18, 2011

(30) Foreign Application Priority Data
Feb. 16, 2010   (FR) ...................................... 10 51083

(51) Int. Cl.
*G08B 21/00*   (2006.01)
(52) U.S. Cl.
USPC ................................... 340/540; 704/E11.003
(58) Field of Classification Search
USPC .............. 340/540; 370/201, 310; 379/406.06; 381/94.1, 110; 704/208, 214, 233, E11.003
See application file for complete search history.

(56) References Cited

U.S. PATENT DOCUMENTS

| | | | |
|---|---|---|---|
| 5,657,422 A * | 8/1997 | Janiszewski et al. . | 704/E11.003 |
| 5,696,821 A * | 12/1997 | Urbanski ................. | 379/406.07 |
| 5,920,834 A * | 7/1999 | Sih et al. ................. | 379/406.06 |
| 6,061,647 A * | 5/2000 | Barrett ................... | 704/E11.003 |
| 6,434,110 B1 * | 8/2002 | Hemkumar ............... | 370/201 |
| 2002/0021798 A1 | 2/2002 | Terada | |
| 2004/0022394 A1 * | 2/2004 | Michaelis ........................ | 381/66 |
| 2009/0030693 A1 | 1/2009 | Shaffer et al. | |

FOREIGN PATENT DOCUMENTS

| WO | WO 2009/009689 A1 | 1/2009 |
|---|---|---|
| WO | WO 2009/022822 A2 | 2/2009 |

* cited by examiner

*Primary Examiner* — John A Tweel, Jr.
(74) *Attorney, Agent, or Firm* — Muncy, Geissler, Olds & Lowe, PLLC

(57) ABSTRACT

Method of detecting the operation of a device for transmitting voice signals between two equipment items so that at least one of the equipment items can send a voice signal and the other equipment item can receive this voice signal, the equipment items being linked by a wireless transmission chain, the method comprising, during a voice signal transmission phase, the steps of:
- detecting on the sending equipment item a presence of a voice signal on transmission, and generating in response a voice presence on transmission signal;
- detecting on the receiving equipment item a presence or an absence of a voice signal on reception, and generating in response a signal indicating voice on reception;
- transmitting the signal indicating voice on reception from the receiving equipment item to the sending equipment item;
- comparing in the sending equipment item the voice presence on transmission signal and the signal indicating voice on reception, and triggering an alarm if the compared signals are not consistent.

8 Claims, 2 Drawing Sheets

METHOD OF DETECTING THE OPERATION OF A VOICE SIGNAL WIRELESS TRANSMISSION DEVICE

The present invention relates to a method of detecting the operation of a voice signal wireless transmission device.

BACKGROUND OF THE INVENTION

As is known, wireless voice communication is expanding increasingly because of the mobility that it offers parties while enabling them to remain connected.

In most cases, an interruption in the transmission of the voice signals is immediately perceptible and presents the simple drawback of obliging one of the parties to call the other back.

However, in some circumstances, it is important for the party who is speaking, that is to say, who is sending the voice signals, to be immediately informed that the communication is interrupted with the party who is in a situation of receiving the transmitted voice message. Such is the case, for example, during a communication between a runway operative located on the ground and a member of the crew of an airplane located onboard said plane.

Moreover, for reasons of ease of implementation and for economy, devices which do not include any transmission failure detection system are generally used to set up the communication. Furthermore, for various reasons, these devices have a short range and their link may easily be disturbed by external events, so that, even for normal operation of the wireless transmission system, the communication may be interrupted. Such devices may cause serious consequences when an interruption to the communication prevents a hazard from being signaled.

OBJECT OF THE INVENTION

One aim of the invention is to propose a method of detecting the operation of a voice signal transmission device implementing known devices that are commonly available.

SUMMARY OF THE INVENTION

To this end, the method according to the invention implements a device for transmitting voice signals between two equipment items so that at least one of the equipment items can send a voice signal and the other equipment item can receive this voice signal, the equipment items being linked by a wireless transmission chain. The method comprises, during a phase for transmitting a voice signal, the steps of:
  detecting on the sending equipment item a presence of a voice signal on transmission, and generating in response a voice presence on transmission signal;
  detecting on the receiving equipment item a presence or an absence of a voice signal on reception, and generating in response a signal indicating voice on reception;
  transmitting the signal indicating voice on reception from the receiving equipment item to the sending equipment item;
  comparing in the sending equipment item the voice presence on transmission signal and the signal indicating voice on reception, and triggering an alarm if the compared signals are not consistent.

Thus, in the case of an interruption to the transmission of the voice signal, no voice signal on reception is detected on the receiving equipment item. The signal indicating voice on reception then indicates an absence of voice signal on reception and is transmitted to the sending equipment item, so that the comparison of the voice presence on transmission signal and of the signal indicating voice on reception immediately reveals the failure and makes it possible to trigger an alarm to the speaker.

According to an advantageous variant of the invention, the method also comprises the steps of:
  transmitting the voice presence on transmission signal from the sending equipment item to the receiving equipment item;
  comparing in the receiving equipment item the voice presence on transmission signal and the signal indicating voice on reception, and triggering an alarm if the compared signals are not consistent.

Thus, the party who is in the receiving situation is also informed of the interruption to the transmission of the voice signal and sets himself to wait until the communication is re-established. For example, in the case of an airplane pilot in a parking maneuver, the pilot interrupts his maneuver until he has proof that he is once again in communication with the runway operative.

According to a first mode of implementation, outside of a voice signal transmission phase, the method comprises the steps of:
  generating in the sending equipment item a voice absence signal;
  generating in the receiving equipment a voice absence signal;
  transmitting the voice absence signal in the receiving equipment item from the receiving equipment item to the sending equipment item;
  comparing in the sending equipment item the voice absence signal in the sending equipment item and the voice absence signal in the receiving equipment item and triggering an alarm if the compared signals are not consistent.

According to a second method of implementation, outside of a voice signal transmission phase, the method comprises the steps of:
  transmitting a simulated voice signal between the two equipment items;
  detecting on the sending equipment item a presence of a simulated voice signal on transmission, and generating in response a simulated voice presence on transmission signal;
  detecting on the receiving equipment item a presence or an absence of a simulated voice signal on reception, and generating in response a signal indicating simulated voice on reception;
  transmitting the signal indicating simulated voice on reception from the receiving equipment item to the sending equipment item;
  comparing in the sending equipment item the simulated voice presence signal on transmission and the signal indicating simulated voice on reception, and triggering an alarm if the compared signals are not consistent.

Outside of a voice signal transmission phase, these two modes of implementation make it possible to monitor the voice signal transmission device so as to ensure that said voice signal transmission device is constantly ready to detect a failure in the transmission of voice signals.

According to an advantageous variant of the first method of implementation, the method also comprises the steps of:
  transmitting the voice absence signal in the sending equipment item from the sending equipment item to the receiving equipment item;

comparing in the receiving equipment item the voice absence signal in the sending equipment item and the voice absence signal in the receiving equipment item, and triggering an alarm if the compared signals are not consistent.

Similarly, according to an advantageous variant of the second method of implementation, the method also comprises the steps of:

transmitting the simulated voice presence on transmission signal from the sending equipment item to the receiving equipment item;

comparing in the receiving equipment item the simulated voice presence on transmission signal and the signal indicating simulated voice on reception, and triggering an alarm if the compared signals are not consistent.

According to a preferred embodiment of the invention, the method also comprises the step of triggering the alarm for one of the equipment items if the comparison step in said equipment item could not be carried out.

According to an advantageous variant of the invention, the method also comprises the steps of:

generating in the receiving equipment item, in response to the signal transmitted by the sending equipment item, a signal indicating acquisition of reception of said signal;

generating in the sending equipment item, in response to the signal transmitted by the receiving equipment item, a signal indicating acquisition of reception of said signal;

transmitting the signal indicating acquisition of reception in the sending equipment item from the sending equipment item to the receiving equipment item;

transmitting the signal indicating acquisition of reception in the receiving equipment item from the receiving equipment item to the sending equipment item;

triggering the alarm for one of the equipment items if the signal indicating acquisition of reception in the other equipment item has not been transmitted to it.

BRIEF DESCRIPTION OF THE DRAWINGS

Other features and advantages of the invention will become apparent from reading the following description of a particular implementation, with reference to the appended drawings, in which.

DETAILED DESCRIPTION OF THE INVENTION

Figure 1:
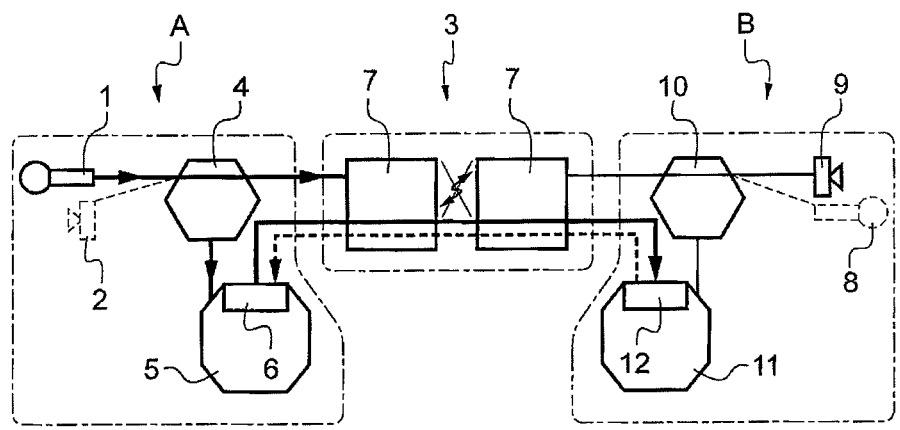
FIG. 1 is a schematic representation of a transmission device implementing the method according to the invention when a voice signal is sent by the sending equipment item but is not received by the receiving equipment item.

With reference to FIG. 1, the method according to the invention is intended to be implemented in a device for transmitting voice signals that comprises an equipment item A that includes a voice signal sending member 1 and a voice signal receiving member 2 linked to a wireless transmission chain 3 via a voice signal detector 4. The voice signal detector 4 is also linked to a processing unit 5 including a first data transmission member 6 which is in turn linked to the transmission chain 3.

The transmission chain 3 comprises two wireless sending-receiving members 7 capable of communicating with one another.

Like the equipment item A, the equipment item B includes a voice signal sending member 8 and a voice signal receiving member 9 linked to the transmission chain 3 via a voice signal detector 10. The voice signal detector 10 is also linked to a processing unit 11 that includes a second data transmission member 12.

At least one of the voice signal detectors 4, 10 is, for example, a detector that detects in a sound signal sent by the voice signal sending member (1 or 8) signals representative of speech in an ambient noise medium. According to a preferred embodiment, at least one of the voice signal detectors 4, 10 is a detector that detects in the sound signal, in addition to the signals representative of speech, steeply sloped rising edges, each rising edge representing the start of a syllable. By trial and error, it is moreover possible, from the value of the slope of an edge, to associate a syllable with said edge.

In the situation illustrated by FIG. 1, the holder of the equipment item A is in the position of speaker, that is to say that the voice signal sending member 1 is sending a signal and the equipment item B is in the receiving position. Furthermore, in the situation illustrated, the transmission chain is assumed to be interrupted from the viewpoint of transmission of the voice signals but nevertheless handles the transmission of data signals. In order to better illustrate this situation, the voice signal receiving member 2 and the voice signal sending member 8 have been represented by dotted lines.

According to the invention, when the voice signal is detected by the voice signal detector 4, a voice presence on transmission signal is generated by the processing unit 5 and is transmitted continuously by the first data transmission member 6. For its part, in the situation discussed, the voice signal detector 10 does not perceive any voice signal so that a signal indicating voice on reception indicating the absence of a voice signal on reception is generated by the processing unit and is transmitted continuously by the second data transmission member 12.

The comparison in each processing unit between the signal sent and the signal received reveals an inconsistency and an alarm is triggered in each of the equipment items.

Figure 2:
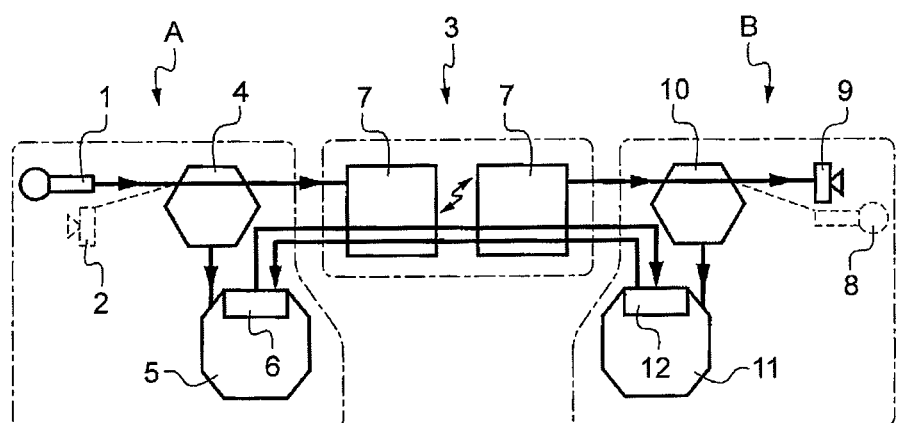
FIG. 2 is a representation identical to that of FIG. 1 when a voice signal is sent and is correctly received by the receiving equipment item.

FIG. 2 illustrates the situation in which the equipment item A is in a situation of speaker and the equipment item B is in a situation of receiver, the transmission chain handling both the transmission of the voice signals and the transmission of the data signals. As previously, the first data transmission member transmits a voice presence on transmission signal generated by the first processing unit 5. The voice signal transmitted is detected by the detector 10.

According to the invention, the second processing unit 11 then generates a signal indicating voice on reception indicating the presence of a voice signal on reception and the second data transmission member 12 transmits this signal to the first data transmission member 6. As previously, a comparison is made by the first processing unit 5 between the signal sent and the signal received. Similarly, a comparison is made in the second processing unit 11 between the signal sent and the signal received. This comparison reveals a consistency. The transmission of voice signals therefore continues normally.

Figure 3:
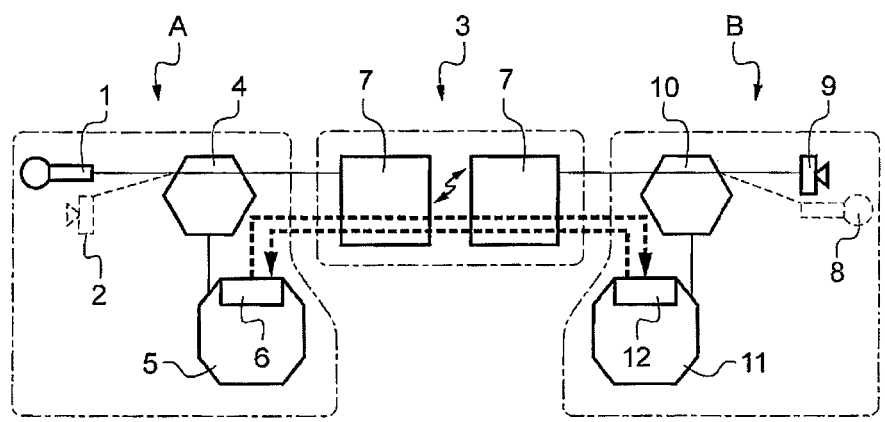
FIG. 3 is a view similar to that of FIG. 1 implementing the method according to the invention, according to a first embodiment, in the absence of sent voice signals.

FIG. 3 illustrates the situation in which no voice signal is sent by the voice signal sending members 1 and 8. By applying a first embodiment, provision is then made to have the first data transmission member 6 transmit a voice absence signal to the second transmission member 12 and then have a signal indicating acquisition of reception of the signal from the first equipment item returned to the first member by the second member. Furthermore, by multiplexing, the second data transmission member transmits to the first data transmission member a voice absence signal. Also, the first data transmission member then returns a signal indicating acquisition of reception of the signal from the second equipment item.

Thus, a comparison is made in the processing unit 5 between the signal sent by the first data transmission member 6 and the received signal originating from the second data transmission member 12. If the signals are consistent, this means that the data transmission is correctly carried out between the equipment item A and the equipment item B. If, on the other hand, the signals are not consistent, this means that the data transmission has been interrupted and the first processing unit 5 then triggers an alarm on the first equipment item A. The monitoring process is repeated as long as no voice signal is sent. A similar comparison is made in the second processing unit 11 between the signal sent by the second data transmission member 12 and the signal received from the first data transmission member 6 and an alarm is triggered in the case of an error.

According to a preferred embodiment, if the processing unit 5 does not acquire the signal indicating acquisition of reception sent by the second data transmission member 12, the processing unit 5 then triggers an alarm on the first equipment item A. In this way, if the processing unit 11 does not acquire the signal indicating acquisition of reception sent by the first data transmission member 6, the processing unit 11 then triggers an alarm on the second equipment item B.

The voice absence signals may consist of messages containing data representative of the state of the corresponding transmission member.

Figure 4:
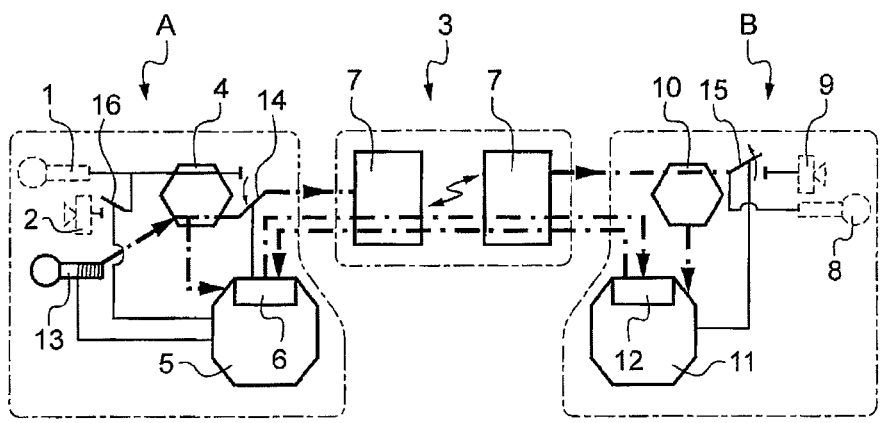
FIG. 4 is a schematic representation of a transmission device implementing the method according to the invention, according to a second embodiment, in the absence of sent voice signals.

FIG. 4 illustrates the situation in which no voice signal is sent by the voice signal sending members 1 and 8 with a second embodiment applied. Here, the equipment item A also includes a member simulating voice signals 13 linked, in parallel to the voice signal sending member 1 and the voice signal receiving member 2, to a toggle switch 14 via the voice signal detector 4. The toggle switch 14, linked to the wireless transmission chain 3, is mounted to toggle between two positions:

a first position in which only the voice signal sending member 1 and the voice signal receiving member 2 are linked to the wireless transmission chain 3, a second position in which only the member simulating voice signals 13 is linked to the wireless transmission chain 3.

The member simulating voice signals 13 and the toggle switch are also linked to the processing unit 5.

The equipment item B has a switch 15 between the voice signal detector 10 and the voice signal receiving member 9, the switch 15 also being linked to the processing unit 11. When the switch 15 is in the closed position, the voice signal detector 10 is linked to the voice signal receiving member 9. Symmetrically, the equipment item A has a switch 16 between the voice signal detector 4 and the voice signal receiving member 2 so that, when the switch 16 is in the closed position, the voice signal detector 4 is linked to the voice signal receiving member 2.

In the situation illustrated by FIG. 4, in the absence of any voice signal being sent, the processing unit 5 transmits a signal to switch over the toggle switch 14 from its first position to its second position and simultaneously a signal to trigger the member simulating voice signals 13. The member simulating voice signals 13 then sends a "simulated" voice signal which is transmitted to the wireless transmission chain 3.

The equipment item A is then back in a speaking situation and the equipment item B is in a receiving situation, the transmission chain handling both the transmission of the simulated voice signal and the transmission of the data signals in the same way as when a non-"simulated" voice signal is sent by the voice signal sending member 1 as illustrated in FIGS. 1 and 2.

Advantageously, when the "simulated" voice signal is detected by the voice signal detector 10, the second processing unit 11 then sends, at the same time as the signal indicating presence of simulated voice signal in reception, a signal to open the switch 15. Similarly, the switch 16 is opened when the "simulated" voice signal is detected by the voice signal detector 4. Thus, the "simulated" voice signal is not transmitted to the voice signal receiving members 2 and 9.

As soon as a voice signal is once again emitted by one of the voice sending members 1 or 8, the processing unit 5 transmits a signal to switch over the toggle switch 14 from its second position to its first position, simultaneously a signal to stop the member simulating voice signals 13 and a signal to close the switch 16. The second processing unit 11 transmits a signal to close the switch 15.

It goes without saying that, regardless of the situation and the embodiment that is chosen, when the processing unit 5, 11 acquires not a signal from each equipment item A and B, but no signal or a single signal from the equipment item A or from the equipment item B, no comparison can be made. This means that the system is defective and the processing unit 5, 11 then triggers an alarm on the first equipment item A or on the second equipment item B.

Obviously, the invention is not limited to the mode of implementation described and lends itself to variant embodiments without departing from the framework of the invention as defined by the claims.

In particular, although here signals indicating acquisition of reception are returned between the first equipment item A and the second equipment item B only in the situation illustrated in FIG. 3, the signals indicating acquisition of reception can be exchanged in any other situation that may be cited.

In particular, although the invention has been described in the situations in which only the voice signals sending member 1 was sending a voice signal, the method according to the invention applies obviously and symmetrically when it is the voice signal sending member 9 which sends a voice signal.

Although the invention has been described in the form of a method that is applied symmetrically to the two equipment items, provision can be made to simplify the method by having the detection of operation performed only on one of the equipment items, for example the equipment item held by a runway operative located on the ground. In this case, in the absence of detection of a voice signal by the detector 10, provision can be made to simply have the signal received from the first data transmission member retransmitted by the second data transmission member. No comparison is then made on the second equipment item.

Furthermore, in the situation of FIG. 1 for which the voice signal is not transmitted correctly but the voice presence on transmission signal is transmitted correctly, provision can be made to detect the operating anomaly in the processing unit 11 and directly transmit a signal triggering an alarm in the equipment item A to the first data processing unit 6.

Although it has been written that the detection of the operation of the wireless voice link was handled by simply comparing the signals sent and received in each processing unit, it is also possible, when the voice signal detector is a detector that also detects edges representing the start of each syllable of speech, to compare the successive edges sent and received in each equipment item to check the consistency of these edges. It is also possible, using a suitable voice signal detector, to detect, over given time slots, sound frequencies contained in a speech and compare the frequencies sent and received in each equipment item to check the consistency of these frequencies. Another possibility consists, using a suitable voice signal detector (using, for example, existing algorithms based on hidden Markov models), to detect phonemes contained in a speech and compare the phonemes sent and received in each equipment item to check the consistency of these phonemes.

Moreover, the voice signal transmission device described can be used for a communication between two people or between one person and a sound communication appliance such as, for example, an onboard intercommunication system conventionally employed on board aircraft.

The invention claimed is:

1. A method of detecting the operation of a device for transmitting voice signals between two equipment items (A, B) so that at least one of the equipment items can send a voice signal and the other equipment item can receive this voice signal, the equipment items being linked by a wireless transmission chain (3), the method comprising, during a phase for transmitting a voice signal, the steps of:
   detecting on the sending equipment item a presence of a voice signal on transmission, and generating in response a voice presence on transmission signal;
   detecting on the receiving equipment item a presence or an absence of a voice signal on reception, and generating in response a signal indicating voice on reception;
   transmitting the signal indicating voice on reception from the receiving equipment item to the sending equipment item;
   comparing in the sending equipment item the voice presence on transmission signal and the signal indicating voice on reception, and triggering an alarm if the compared signals are not consistent.

2. The method as claimed in claim 1 also comprising the steps of:
   transmitting the voice presence on transmission signal from the sending equipment item to the receiving equipment item;
   comparing in the receiving equipment item the voice presence on transmission signal and the signal indicating voice on reception, and triggering an alarm if the compared signals are not consistent.

3. The method as claimed in claim 1, comprising, outside of a voice signal transmission phase, the steps of:
   generating in the sending equipment item a voice absence signal;
   generating in the receiving equipment a voice absence signal;
   transmitting the voice absence signal in the receiving equipment item from the receiving equipment item to the sending equipment item;
   comparing in the sending equipment item the voice absence signal in the sending equipment item and the voice absence signal in the receiving equipment item and triggering an alarm if the compared signals are not consistent.

4. The method as claimed in claim 3, also comprising the steps of:
   transmitting the voice absence signal in the sending equipment item from the sending equipment item to the receiving equipment item;
   comparing in the receiving equipment item the voice absence signal in the sending equipment item and the voice absence signal in the receiving equipment item, and triggering an alarm if the compared signals are not consistent.

5. The method as claimed in claim 1, comprising, outside of a voice signal transmission phase, the steps of:
   transmitting a simulated voice signal between the two equipment items;
   detecting on the sending equipment item a presence of a simulated voice signal on transmission, and generating in response a simulated voice presence on transmission signal;
   detecting on the receiving equipment item a presence or an absence of a simulated voice signal on reception, and generating in response a signal indicating simulated voice on reception;
   transmitting the signal indicating simulated voice on reception from the receiving equipment item to the sending equipment item;
   comparing in the sending equipment item the simulated voice presence signal on transmission and the signal indicating simulated voice on reception, and triggering an alarm if the compared signals are not consistent.

6. The method as claimed in claim 5, also comprising the steps of:
   transmitting the simulated voice presence on transmission signal from the sending equipment item to the receiving equipment item;
   comparing in the receiving equipment item the simulated voice presence on transmission signal and the signal indicating simulated voice on reception, and triggering an alarm if the compared signals are not consistent.

7. The method as claimed in claim 1, also comprising the step of triggering the alarm for one of the equipment items if the comparison stage in said equipment item could not be carried out.

8. The method as claimed in claim 1, also comprising the steps of:
   generating in the receiving equipment item, in response to the signal transmitted by the sending equipment item, a signal indicating acquisition of reception of said signal;
   generating in the sending equipment item, in response to the signal transmitted by the receiving equipment item, a signal indicating acquisition of reception of said signal;
   transmitting the signal indicating acquisition of reception in the sending equipment item from the sending equipment item to the receiving equipment item;
   transmitting the signal indicating acquisition of reception in the receiving equipment item from the receiving equipment item to the sending equipment item;
   triggering the alarm for one of the equipment items if the signal indicating acquisition of reception in the other equipment item has not been transmitted to it.

* * * * *